Patented Nov. 14, 1933

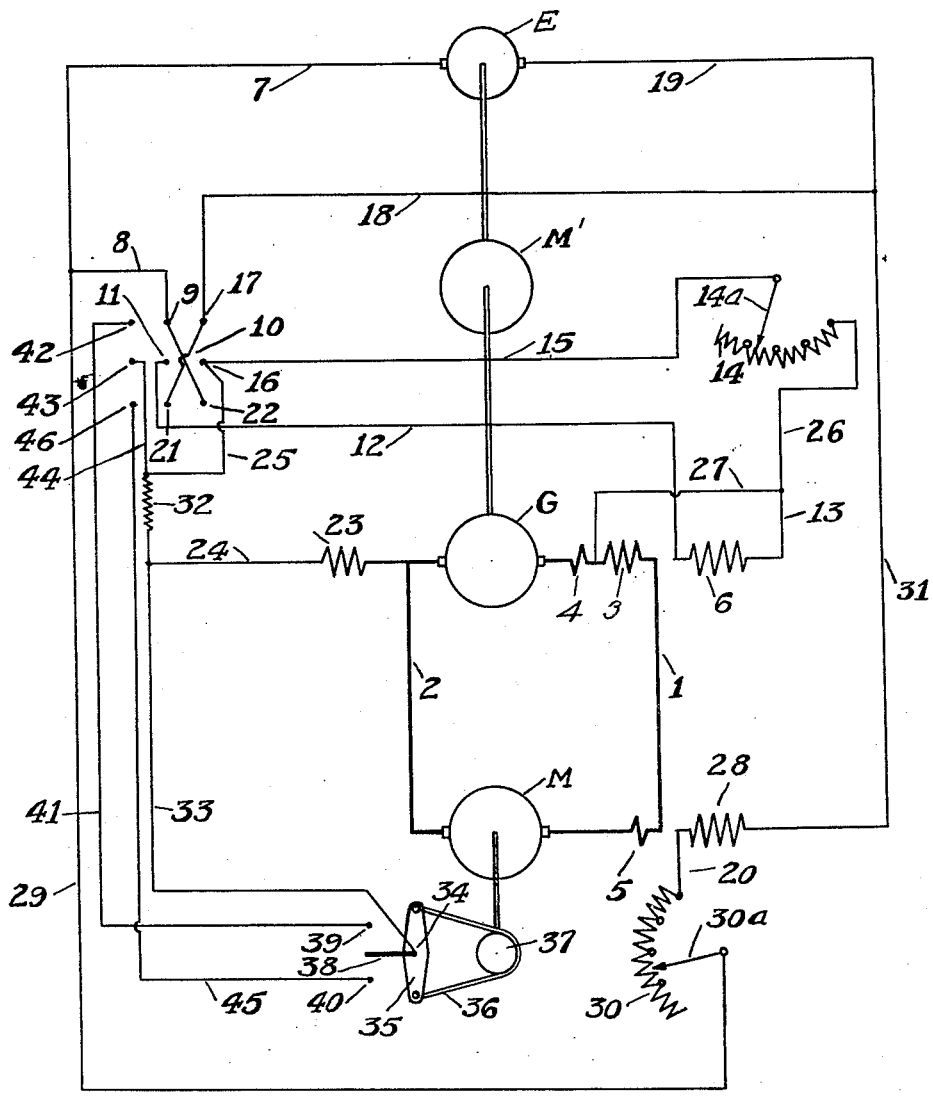

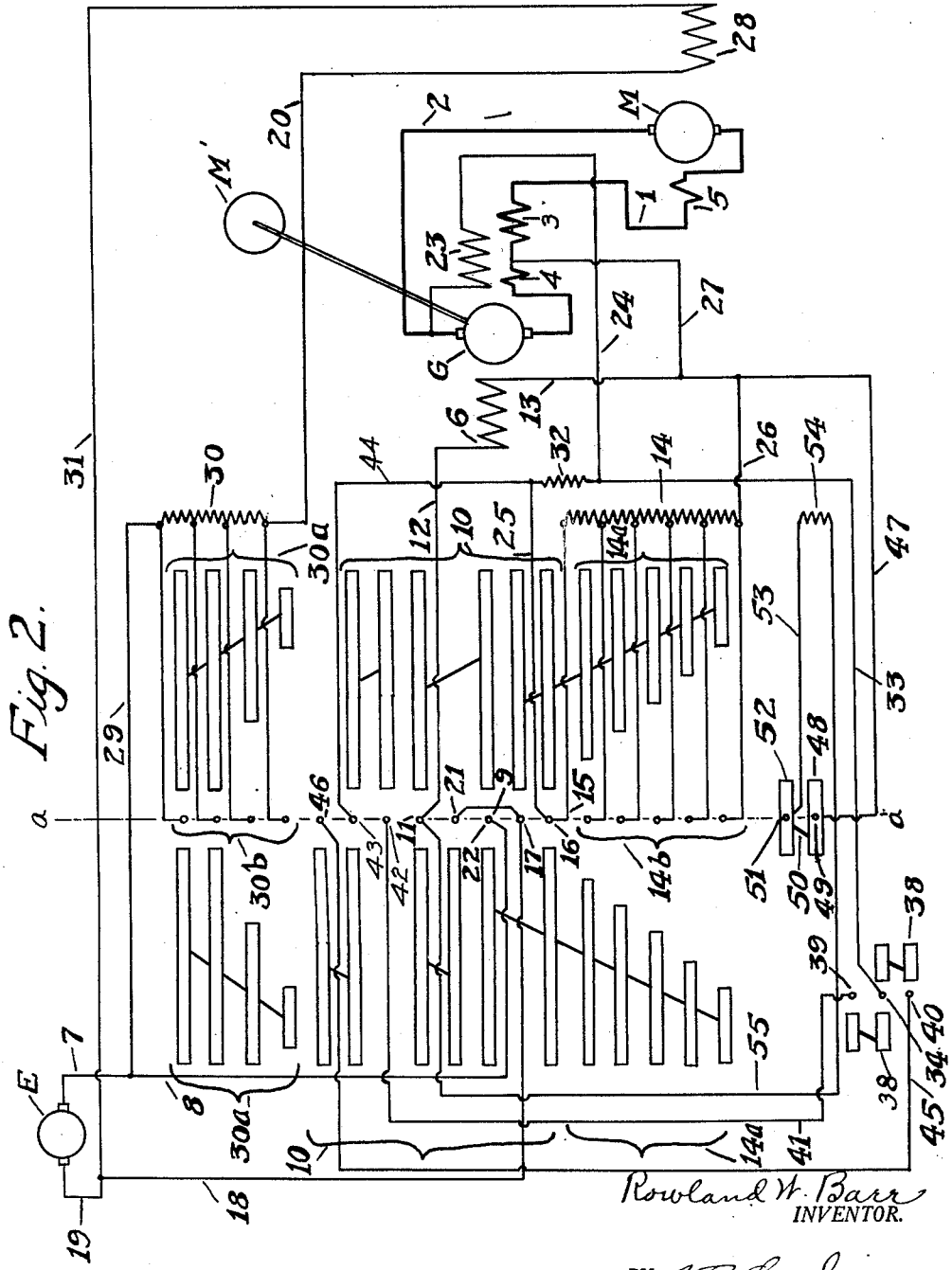

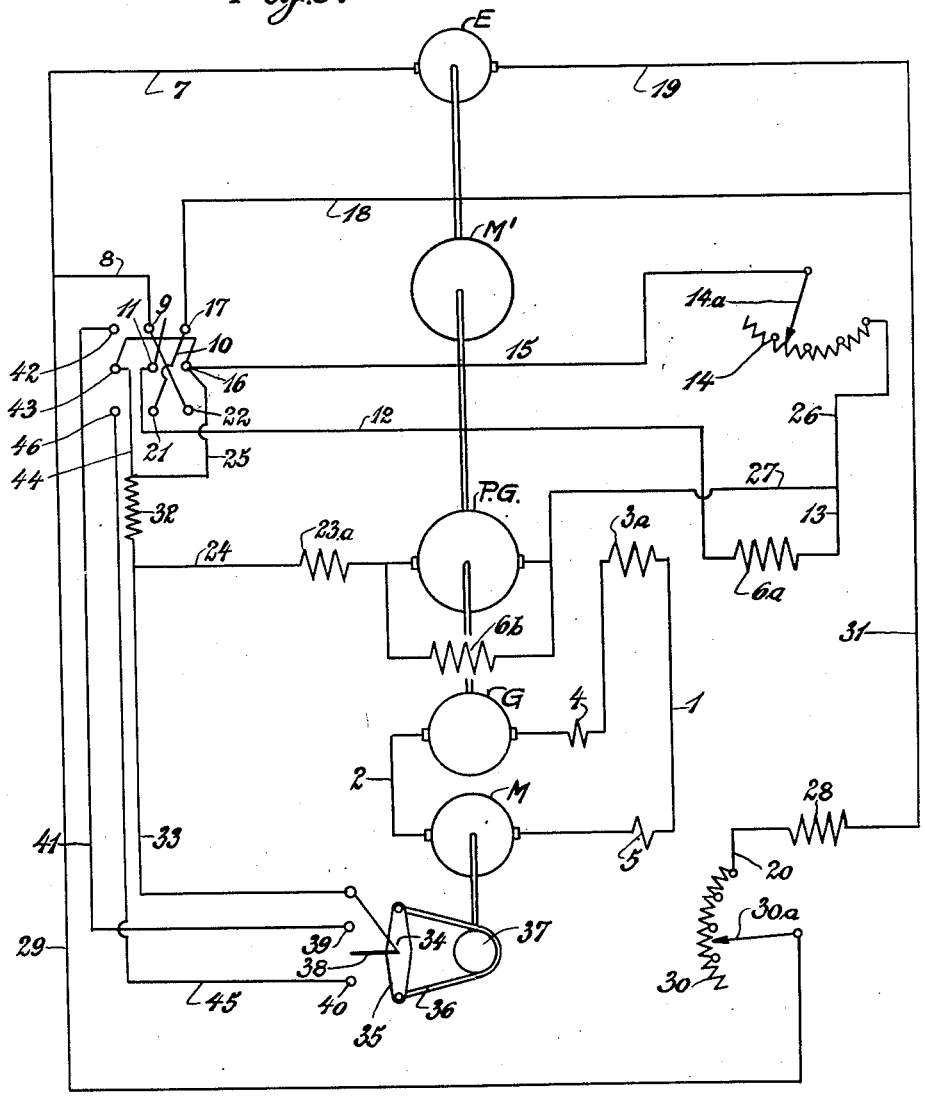

1,934,744

UNITED STATES PATENT OFFICE 1,934,744

MEANS FOR CONTROLLING ELECTRIC MOTORS

Rowland W. Barr, Coya Norte, via Tocopilla, Chile, assignor to Bucyrus-Erie Company, South Milwaukee, Wis., a corporation of Delaware Application February 21, 1929
Serial No. 341,600½

11 Claims. (Cl. 172—239)

Motors have heretofore been controlled by influencing the generator from which the motor receives its current. Such a control is found in what is known as the Ward-Leonard apparatus. In handling some sorts of machines, such for instance as power excavators, peculiar conditions are encountered which require a variation from the controls heretofore used.

One of the difficulties, or problems, encountered in such apparatus is the danger of delivering to the implement a greater power than the implement is designed to sustain. This is particularly of importance with relation to power shovels in that with an excessive power the shovel may be over-turned, or mechanical parts may be broken.

In an effort to correct this difficulty, heretofore apparatus of this type has been hooked up with a separately-excited main field and a differential series field for the generator, the generator being controlled by varying the resistance in the separately-excited field circuit. With such a structure, as the motor draws heavier current, the generator series field is increased and overpowers the separately-excited field and in consequence the net field strength is reduced, so that at some definite pre-determined point the generator voltage dies, thus making a point of safety in the operation of the device. A serious defect, however, developed in this structure, in that this tapering-off was too gradual, so that in the higher working ranges the speed of the controlled motor was seriously affected. To correct this difficulty, the separately-excited field was supplemented by a self-excited shunt field, the effect of which was to boost the voltage of the generator and consequently the speed of the motor at a working range closer to this diminishing point of safety. This self-excited field, being directly excited by the generator, fades out at the safety point, when the series field neutralizes the two shunt fields, so that the arrangement is just as effective a safety device as where the self-excited shunt field is omitted, but in the working range the field strength of the self-excited shunt field is added to that of the separately-excited field, as opposed to the series field, and consequently a better working condition is produced.

Difficulty arose in the operation of this last-mentioned apparatus, however, in that with such machines as power shovels very frequent stoppages and reversals are necessary and when, in the effort to stop the motor, the separately-excited field was diminished through the variable resistance of the control, the field strength of the self-excited field continued practically undiminished and would dominate in the last analysis the series field at light loads, and in consequence the motor could not be readily stopped, except by reversing the separately-excited field so as to buck down the greater strength of the self-excited field.

This difficulty may be considerably obviated by interposing, in the self-excited field circuit, a variable resistance, which will be increased as the field strength of the separately-excited field is reduced. In this way the tendency of the self-excited field to remain built up, in spite of the reduction of the separately-excited field, is obviated to a considerable extent.

I have found that such a method and apparatus may be simplified by making a part of the separately-excited field circuit and the self-excited field circuit in common; and, where this is done, the resistance interposed as to both fields is preferably a common resistance. This simplies the control in many respects.

I have also found that where devices of this character are used and the operator throws the controller throughout its range as from full forward to reverse, the motor continuing momentarily in the forward direction after the reverse of the controller, the self-excited field is maintained at operative strength and in consequence retards the reversing action of the generator and consequently the reversal of the motor. I have remedied this by inserting in the self-excited field circuit a resistance, which is automatically cut in upon the throwing of the reversing switch. This resistance is then thrown out automatically in response to the initial movement of the motor in the reverse direction. In this way this retardation of the reversing action may be very largely eliminated.

Features and details of my invention will appear more fully from the specification and claims.

A preferred embodiment of the invention is illustrated in the accompanying drawings as follows:—

Fig. 1 shows the system, or apparatus, diagrammatically.

Fig. 2 shows a view in which the system is illustrated in connection with a development of an ordinary controller.

Fig. 3 shows a modification of the device of Fig. 1, this modification consisting in the addition of a pilot generator.

M' marks a prime mover. As shown, this is indicated as an electric motor but may be any form of prime mover. A generator G is mechanically connected with this prime mover, and an exciter E may also be directly connected with such prime mover. The controlled motor M, such for instance as the hoisting, swinging, or crowding motor of a power shovel, is electrically connected and driven from the generator, being directly connected thereto by wires 1 and 2. A generator field 3 is arranged in series in the wire 1, and a commutating field 4 may also be in series in the usual manner. A commutating field 5 may also be in series in the line 1 for the motor M.

A separately-excited field 6 is the main operative field of the generator. It is opposed, and at high current demands neutralized, by the differential series field 3 of the generator. This field 6 is connected with the exciter E through the following circuit: A wire 7 leads from the exciter. It is connected by a wire 8 to the post 9 of a triple-point double-throw reversing switch 10. In the forward direction current is carried by the switch to a post 11, passes by a wire 12 from the post 11 to the field 6, and from the field by a wire 13, wire 26, to the variable resistance 14 controlled by the movable arm 14a, and from this movable arm by a wire 15 to a post 16, from the post 16 by the reversing switch 10 to a post 17, and thence by wires 18 and 19 to the exciter. By varying the resistance 14 the strength of the field 6 may be varied to vary the effective field of the generator, thus varying its voltage and in consequence the speed of the motor.

The reversing circuit is indicated as follows: When the reversing switch is thrown, a post 21 is connected with the post 11, and a post 22 is connected with the post 16, thus reversing the current through the circuit passing through the field 6.

A self-excited shunt field 23 is provided for the generator G. This field supplements the separately-excited field 6: and is, like field 6, opposed by the series field 3. The circuit for field 23 passes from one pole of the generator, through wire 27, wire 26, variable common resistance 14, movable arm 14a, wire 15, post 16, wire 25, wire 24 (through either a shaft switch or a resistance, hereinafter described), field 23, and an unnumbered wire, to the other pole of the generator. It will be noted that wire 26, resistance 14, movable arm 14a, and wire 15 are common to both this circuit and the circuit for the separately excited field 6. Field 23 is thus subjected, in common with field 6, to the resistance 14, and to the variation of this resistance, and in consequence field 23 is cut down as field 6 is cut down. This arrangement obviates the tendency of the generator G to over-run by reason of the continued field-strength in the self-excited field 23 as above suggested. All this assumes that the fields 6 and 23 are so wound and connected that, with these two fields cumulating, the exciter current through field 6 and the generator current through field 23 traverse resistance 14 in the same direction.

A field 28 for the motor may be arranged in the exciter circuit, this circuit being traced through the wire 29 from the wire 7, movable arm 30a and variable resistance 30 by wire 20 through the field 28 and wire 31 to the wire 19 leading to the exciter. This operates in the well-known manner.

When switch 10 is thrown to reverse, and resistance is gradually cut-out by rheostat 14 so as to speed up the reversal, field 23, which still maintains its old sense, becomes stronger and stronger in its old sense, the more the effort is made to reverse; thus field 23 bucks the now-reversed field 6. In order to avoid this field strength in the field 23, which obviously tends to delay the reversal of the motor, I interpose the resistance 32 in the self-excited field-circuit between the wires 25 and 24; and, so long as the motor moves forward with the controller in reverse position, this resistance 32 will remain in the self-excited field-circuit. The control of the self-excited circuit for this purpose is accomplished by what is known as a shaft-switch, which is controlled and preferably thrown by the motor itself. The connections for this shaft-switch are as follows: A wire 33 extends from the wire 24 to a post 34 on a switch arm carrier 35. This carrier is in the form of a rocking bar, the ends of which are connected by a belt 36 with a pulley 37 mechanically connected with the motor M. As the motor moves in either direction, it operates through the belt 36 to rock the carrier 35 in the direction toward which the pulley moves; and, after rocking this carrier, the rotation of the motor holds the carrier in the new position through the friction of the belt on the pulley. A switch-arm 38 is carried by the carrier 35, and is adapted to contact post 39 or 40 selectively. There are three possible circuits by which the generator current may selectively reach field 23, depending on the direction in which switch 10 is set and the direction in which motor M is turning. In one of these circuits, that is to say whenever the motor is turning in the opposite direction from that in which switch 10 is set for it to turn, the current will pass through the permanent resistance 32. But in the other two of the circuits, that is to say whenever the motor is turning in the same direction as that in which switch 10 is set for it to turn, the current will be shunted around this permanent resistance.

Switch 10 is thrown up for motor M to rotate clockwise. If the motor is rotating clockwise, the shaft-switch 38 will likewise be thrown up. Current will pass from generator G, through commutating field 4, wires 27 and 26, variable resistance 14, movable arm 14a, wires 15, 25 and 44, posts 43 and 42, wire 41, post 39, shaft-switch 38, wires 33 and 24, and field 23, back to generator G.

Switch 10 is thrown down for motor M to rotate counter-clockwise. If the motor is rotating counter-clockwise, the shaft-switch 38 will likewise be thrown down. Current will pass from generator G, through commutating field 4, wires 27 and 26, variable resistance 14, movable arm 14a, wires 15, 25 and 44, posts 43 and 46, wire 45, post 40, shaft-switch 38, wires 33 and 24, and field 23, back to generator G.

But if, with switch 10 thrown up, the motor M is rotating counter-clockwise, with the shaft-switch 38 correspondingly down, or if with switch 10 thrown down, the motor M is rotating clockwise, with the shaft-switch 38 correspondingly up, the current will pass from generator G, through commutating field 4, wires 27 and 26, variable resistance 14, movable arm 14a, wires 15 and 25, permanent resistance 32, wire 24, and field 23 back to generator G.

In the three preceding paragraphs, in order to simplify the comparison under discussion, I have kept a uniform order of description in each of the three paragraphs, although it should be obvious that, under certain of the situations under discussion, the current will traverse the elements in a direction reverse to that described.

In Fig. 2 I have indicated a practical installation carrying out the scheme as illustrated diagrammatically in Fig. 1. In this figure, I have indicated a controller as developed, and the same parts as appear in Fig. 1 are identified with the same reference numerals. The several contact fingers are indicated in a line $a$ and the wires having the circuits, as indicated in the diagram, lead to these several contacts. The movable arm 30a of the diagram, Fig. 1, corresponds to the group of segments 30a electrically connected together and operating in connection with contacts 30b in the ordinary controller manner, the contacts being connected with the resistance sections 30 and being cut out successively in the ordinary manner of a controller, and thus controlling the resistance to the field of the motor as in common practice. These segments are arranged at opposite sides of the line "$a$", and operate in exactly the same manner, one set of segments for the forward motion and the other for the reverse. To suit varying conditions, as for instance when there is a marked difference of power requirements in one direction than in the other, as in a hoisting engine on a power shovel, these segments may be varied to take care of the conditions.

The contacts of the reversing switch are indicated in the line "$a$", and operate in relation to a series of segments, the group of which are indicated at 10 corresponding to the reversing switch in Fig. 1. These operate in the ordinary manner of controller reversing switches.

In like manner the movable arm 14a, as indicated in Fig. 1, corresponds to the series of segments 14a on the controller drum operating in connection with contacts 14b, successively cutting out sections of the resistance 14 in the usual manner. The line connections with relation to the generator fields and exciters can be readily followed, these circuits being exactly as outlined in the diagram, Fig. 1.

The shaft-switch is also indicated in Fig. 2, the segments 38 corresponding to the arm 38 in operation, and the apparatus for operating these segments being as indicated in the diagram in Fig. 1. In Fig. 2, movement of the controller to the right corresponds to throwing switch 10 down in Fig. 1; but movement of the shaft-switch 38 to the right in Fig. 2 corresponds to its movement up in Fig. 1.

It should also be noted that whenever the controller is returned to neutral, the controller segments no longer connect finger 43 to either finger 42 or finger 46, and accordingly, regardless of the setting of the shaft switch, it is not possible to short the circuit of field 23 around resistance 32.

Accordingly resistance 32 is always in the circuit of field 23 whenever either the controller is in neutral, or the motor is running in a direction contrary to that for which the controller is set for it to run.

Thus my invention makes it possible, in a simple and convenient manner, to strengthen the voltage of the generator throughout the working range of the motor, while still maintaining the ability to stop the motor quickly by moving the controller to neutral or beyond.

In addition I have shown in Fig. 2 the discharge resistor, which as shown, interposes a discharge resistance against the generator separately-excited field when the controller is in the off-position and the field is thus disconnected from the exciter. This may be readily followed in the drawings, starting with the field 6. The connection runs to the wire 13, and from the wire 13 by a wire 47 to a contact 49 (this contact when the controller is in neutral position being operated on by the segment 48, which is connected by a wire 50 with a segment 52), and thence by a contact 51 and wire 53 through discharge resistance 54, wire 55, contact 11, and wire 12, to the other side of the field. The purpose of this is well understood.

While I have shown in these figures a direct connection between the controller and the various fields controlled thereby, it will, of course, be understood that the controller may act merely as a pilot operating separately interposed magnetic contactors, where the current or voltage requirements are too great to be handled directly by the controller. To the same end, the controls herein described may operate on a pilot generator, the pilot generator acting as an exciter for, and controlling the characteristics of, a main generator furnishing the current direct to the motor. Such a pilot arrangement is illustrated by Figure 3, which is identical to Figure 1, with the following exceptions. The separately excited field 6a, the self-excited shunt field 23a, and the series field 3a of the generator G, are applied as three fields to the pilot generator PG, being respectively excited by the exciter E, the pilot generator PG and the main generator G (in series in the armature circuit of the main generator G and the motor M); and the main generator G has but one field 6b, which is excited from the armature of the pilot generator PG. But in each case the motor is directly responsive to generator voltage, in that the motor control is accomplished through the generator control. I do not wish to be limited, therefore, to a control which operates directly upon the wires of the generator furnishing the main current to the motor, as such pilot arrangements may be used where such current is sufficiently great to make the use of a small controller impractical.

When, in any of the claims, I recite a resistance "common", to two fields, I mean a resistance such that, whenever any part of it is inserted in one of the two fields, the same part is simultaneously inserted in the other field. But, rather than employ a long circumlocution to this effect in each of the claims, I shall use merely the word "common", as thus defined.

The use of the word "directly" in any of the claims, is not to be construed to preclude a response by the motor to the voltage of a pilot generator, acting on the motor through the main generator.

I make no claim that I was the first to conceive the use of a variable resistance in the circuits of both fields 6 and 23, nor that I was the first to conceive the use, with a resistance common to those two circuits, of an additional resistance in one only of those circuits. Claims to these features appear in the co-pending application of Paul S. Stevens, filed August 20, 1928, Serial No. 300,675.

What I claim as new is:—

1. In an electric control system, the combination of: a generator, including a self-excited field and a separately excited field; a common resistance; means for interposing this resistance in the circuits of both of said fields; and a motor directly responsive to the voltage of the generator.

2. In an electric control system, the combination of: a generator, including a self-excited field and a separately excited field; a common variable resistance; means for interposing this resistance in the circuits of both of said fields, and for varying this resistance; and a motor directly responsive to the voltage of the generator.

3. In an electric control system, the combination of: a generator, including a self-excited shunt field, a separately excited field and a series field; a common resistance; means for interposing this resistance in the circuits of the self-excited shunt field and the separately excited field; and a motor directly responsive to the voltage of the generator.

4. In an electric control system, the combination of: a generator, including a self-excited shunt field, a separately excited field and a series field; a common variable resistance; means for interposing this resistance in the circuits of the self-excited shunt field and the separately excited field, and for varying this resistance; and a motor directly responsive to the voltage of the generator.

5. In an electric control system, the combination of: a generator, including a self-excited field and a separately excited field, these two fields being cumulative; a common resistance; means for interposing this resistance in the circuits of both of said fields; and a motor directly responsive to the voltage of the generator.

6. In an electric control system, the combination of: a generator, including a self-excited field and a separately excited field, these two fields being cumulative; a common variable resistance; means for interposing this resistance in the circuits of both of said fields, and for varying this resistance; and a motor directly responsive to the voltage of the generator.

7. In an electric control system, the combination of: a generator, including a self-excited shunt field, a separately excited field and a series field, the self-excited shunt field and the separately excited field being cumulative, and the series field being opposed to the other two fields; a common resistance; means for interposing this resistance in the circuits of the self-excited shunt field and the separately excited field; and a motor directly responsive to the voltage of the generator.

8. In an electric control system, the combination of: a generator, including a self-excited shunt field, a separately excited field and a series field, the self-excited shunt field and the separately excited field being cumulative, and the series field being opposed to the other two fields; a common variable resistance; means for interposing this resistance in the circuits of the self-excited shunt field and the separately excited field; and for varying this resistance; and a motor directly responsive to the voltage of the generator.

9. In an electric control system, the combination of: a generator, including a self-excited field and a separately excited field; resistance; means for interposing this resistance in the circuits of both fields; a motor directly responsive to the voltage of the generator; means for reversing the generator, and thereby reversing the motor; further resistance; and motor controlled means, whereby the further resistance is held in the circuit of the self-excited field whenever the motor is running in the direction opposite to that in which the reversing means is set for it to run, and is thrown out of that circuit when the motor is running in the direction in which the reversing means is set for it to run.

10. In an electric control system, the combination of: a generator, including a self-excited field and a separately excited field; variable resistance; means for interposing this resistance in the circuits of both fields, and for varying this resistance; a motor directly responsive to the voltage of the generator; means for reversing the generator, and thereby reversing the motor; further resistance; and motor controlled means, whereby the further resistance is held in the circuit of the self-excited field whenever the motor is running in the direction opposite to that in which the reversing means is set for it to run, and is thrown out of that circuit when the motor is running in the direction in which the reversing means is set for it to run.

11. In an electric control system, the combination of: a generator, including a self-excited shunt field, a separately excited field and a series field; resistance; means for interposing this resistance in the circuits of the self-excited shunt field and the separately excited field; a motor directly responsive to the voltage of the generator; means for reversing the generator, and thereby reversing the motor; further resistance; and motor controlled means, whereby the further resistance is held in the circuit of the self-excited field whenever the motor is running in the direction opposite to that in which the reversing means is set for it to run, and is thrown out of that circuit when the motor is running in the direction in which the reversing means is set for it to run.

ROWLAND W. BARR.